United States Patent [19]

Baka

[11] Patent Number: 5,927,783
[45] Date of Patent: Jul. 27, 1999

[54] MODULAR UNIVERSAL SHELF FOR AN OPEN LOAD BED OF A PICKUP TRUCK

[76] Inventor: Michael A. Baka, 1996 Timberline Way, Clarksville, Tenn. 37042

[21] Appl. No.: 08/940,775

[22] Filed: Sep. 30, 1997

[51] Int. Cl.$^6$ .................................................. A62C 27/00
[52] U.S. Cl. ............................................................ 296/37.6
[58] Field of Search ............................................ 296/37.6

[56] References Cited

U.S. PATENT DOCUMENTS

| | | | |
|---|---|---|---|
| 2,784,027 | 3/1957 | Temp | 296/37.6 |
| 4,394,100 | 7/1983 | Sperlich | 296/37.6 |
| 4,733,898 | 3/1988 | Williams | 296/37.6 |
| 4,830,242 | 5/1989 | Painter | 296/37.6 |
| 4,900,080 | 2/1990 | Morris . | |
| 5,118,156 | 6/1992 | Richard | 296/37.6 |
| 5,201,561 | 4/1993 | Brown . | |
| 5,265,993 | 11/1993 | Wayne . | |
| 5,564,776 | 10/1996 | Schlachter . | |

*Primary Examiner*—Gary C. Hoge
*Attorney, Agent, or Firm*—Michael I. Kroll

[57] ABSTRACT

A modular universal shelf (10) for an open load bed (12) of a pickup truck (14). The open load bed (12) has a load deck (16), a front wall (18), a tailgate (20), a pair of side walls (22), a pair of wheel wells (24) and a pair of horizontal rails (26) each formed on an inner surface (28) of each of the side walls (22). The shelf comprises an auxiliary deck (30). A structure (32) is for mounting the auxiliary deck (30) in a secure horizontal manner completely above the load deck (16) and the wheel wells (24), between the horizontal rails (26) on the side walls (22), from the front wall (18) to the tailgate (20), so as to produce a hide-a-way out of sight storage area for cargo (34) between the load deck (16) and the auxiliary deck (30). The auxiliary deck (30) can be utilized to store additional cargo (34), support people, pets and other items thereon.

17 Claims, 5 Drawing Sheets

MODULAR UNIVERSAL SHELF FOR AN OPEN LOAD BED OF A PICKUP TRUCK

BACKGROUND OF THE INVENTION

1. Field of the Invention

The instant invention relates generally to pickup truck storage devices and more specifically it relates to a modular universal shelf for an open load bed of a pickup truck. The modular universal shelf is mounted in a secure manner horizontally and completely above the deck of the open load bed, so as to produce a hide-a-way out of sight storage area for cargo and an auxiliary deck for storage of additional cargo or supporting people, pets and other items thereon.

2. Description of the Prior Art

Numerous pickup truck storage devices have been provided in prior art. For example, U.S. Pat. Nos. 4,900,080 to Morris, II; 5,201,561 to Brown; 5,265,993 to Wayne and 5,564,776 to Schlachter all are illustrative of such prior art. While these units may be suitable for the particular purpose to which they address, they would not be as suitable for the purposes of the present invention as heretofore described.

MORRIS, II, CLARK W.

PARTIAL COVER FOR PICKUP TRUCK BED

U.S. Pat. No. 4,900,080

A partial cover for pickup truck beds having a plurality of longitudinal exterior grooves extending from front to rear of the cover. The cover covers the full width of the bed and part of the length from the cab to a mid portion of the bed and is coupled at one end of the truck adjacent the cab extending toward the rear of the truck where it may rest on the wheel well or optional supporting brackets. A rear spoiler is provided across the width of the cover to stability. An optional water curtain may be provided.

BROWN, MICHAEL F.

STORAGE UNIT FOR USE IN PICKUP TRUCKS

U.S. Pat. No. 5,201,561

A storage box for use on pickup trucks which is mainly composed of a lid and flap, which when each are hinged and secured to the truck bed create a versatile unit capable of protected and secure storage, or other positions of usage that permit easy utilization of the space or compact storage when not installed.

WAYNE, MARK

TRUCK BED DIVIDER SYSTEM

U.S. Pat. No. 5,265,993

A truck bed divider system for placement within the bed of a truck includes at least one primary divider and at least one secondary divider. The primary dividers include brackets at each end that provide a frictional fit against the interior side of the walls of the bed of the truck. By a slotted interrelationship, the primary dividers are situated within the bed at their preferred positions and are thereafter adjusted by extending the brackets outward relative to the divider body to their maximum extent whereby they are pressed against the side of the bed and held thereto by tension, thus eliminating the need for fasteners. The secondary dividers are provided with hooks at their ends and are interfittable between the primary dividers by being hooked into slots perpendicularly defined in the body of the primary dividers. Both primary and secondary dividers are preferably provided with shelf extensions for the placement of shelves thereupon.

SCHLACHTER, BRADLEY S.

STORAGE ENCLOSURE FOR OPEN LOADED MOTOR VEHICLE

U.S. Pat. No. 5,564,776

A storage enclosure for a motor vehicle having a load bed defined by opposed sidewalls, a load deck and a rear closure, such as a tailgate, includes a generally horizontal top wall extending between the load bed sidewalls and a depending front wall having a hinged wall portion which may be positioned extending generally horizontally above the deck to form an enclosure space forward of the tailgate when in its closed position. The hinged wall portion may be positioned to extend vertically downwardly from the front wall at its hinge connection to increase the size of the enclosure space defined between the top wall and the load deck, the opposed sidewalls and the tailgate in its closed position. The hinged wall portion may be locked in either working position. The enclosure top wall may be secured to the opposed load bed sidewalls at stake recesses and the front wall may have opposed recesses to accommodate the load bed sidewall beam portions. The enclosure is particularly adapted for open load bed vehicles such as light duty pickup trucks.

SUMMARY OF THE INVENTION

A primary object of the present invention is to provide a modular universal shelf for an open load bed of a pickup truck that will overcome the shortcomings of the prior art devices.

Another object is to provide a modular universal shelf for an open load bed of a pickup truck that is mounted in a secure manner, horizontally and completely above the deck of the open load bed, so as to produce a hide-a-way out of sight storage area for cargo and an auxiliary deck for storage of additional cargo or supporting people, pets and other items thereon.

An additional object is to provide a modular universal shelf for an open load bed of a pickup truck that has multipurpose functions, wherein the auxiliary deck can be used as a work platform, as a picnic table, as a game board support and as a bed liner.

A further object is to provide a modular universal shelf for an open load bed of a pickup truck that is simple and easy to use.

A still further object is to provide a modular universal shelf for an open load bed of a pickup truck that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
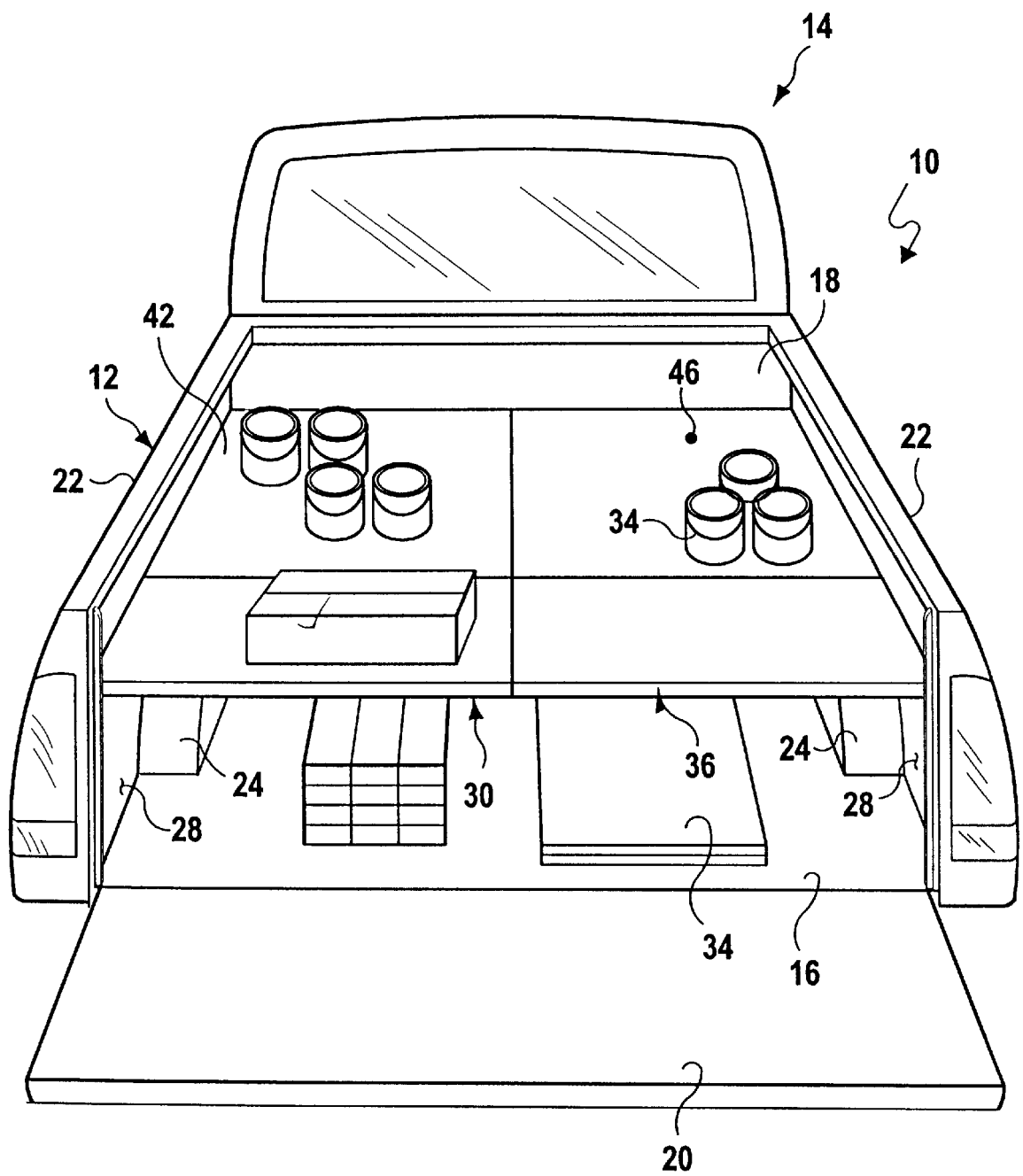
FIG. 1 is a rear perspective view of a pickup truck, showing the instant invention installed within the bed with various types of cargo stored therein.
Figure 2:
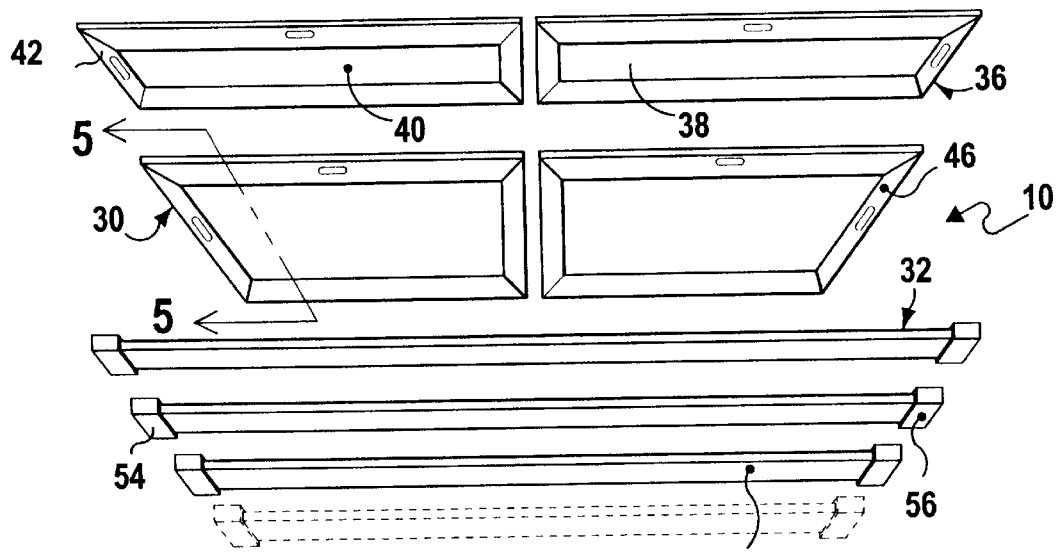
FIG. 2 is a rear perspective view similar to FIG. 1, showing the various components of the instant invention exploded therefrom in a bottom perspective view.
Figure 2:
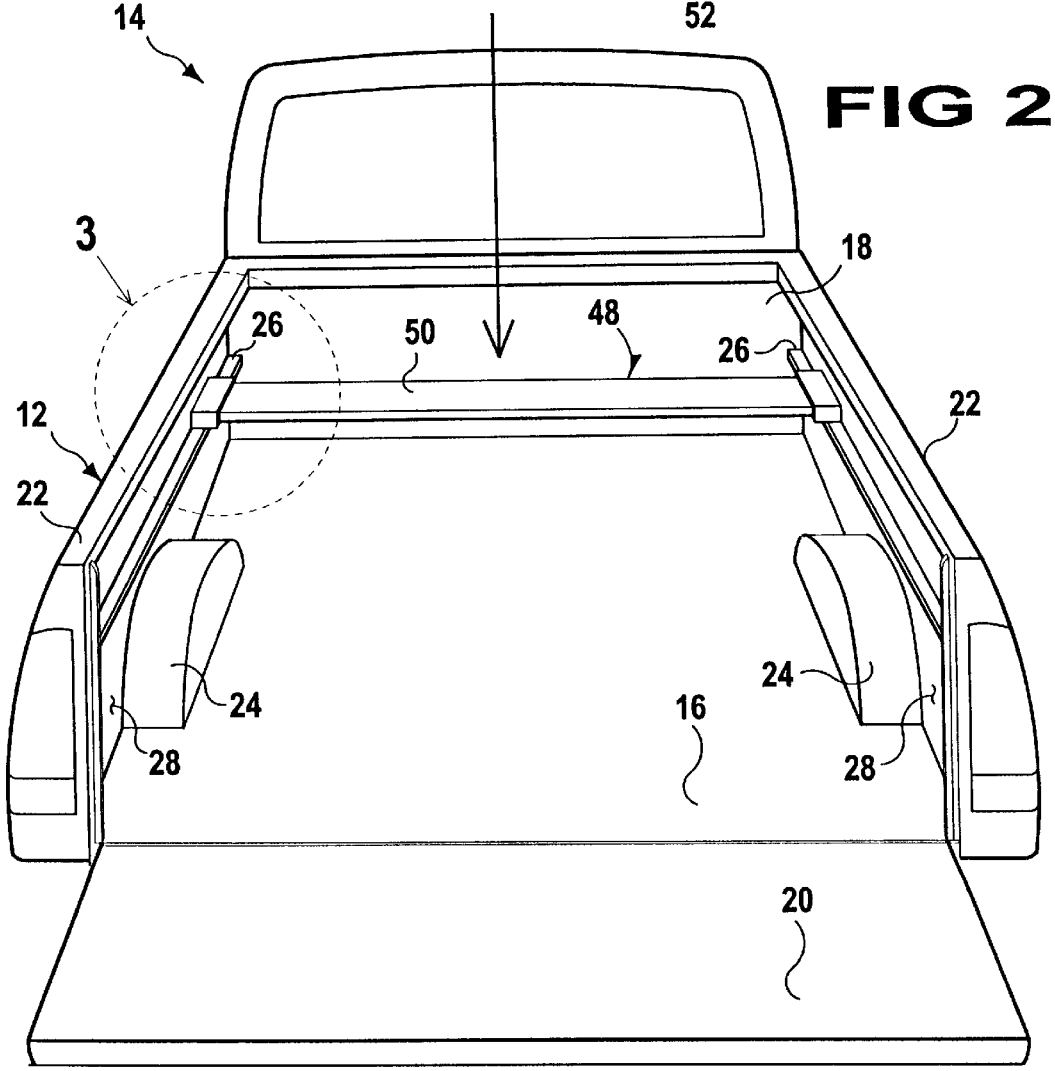
Figure 3:
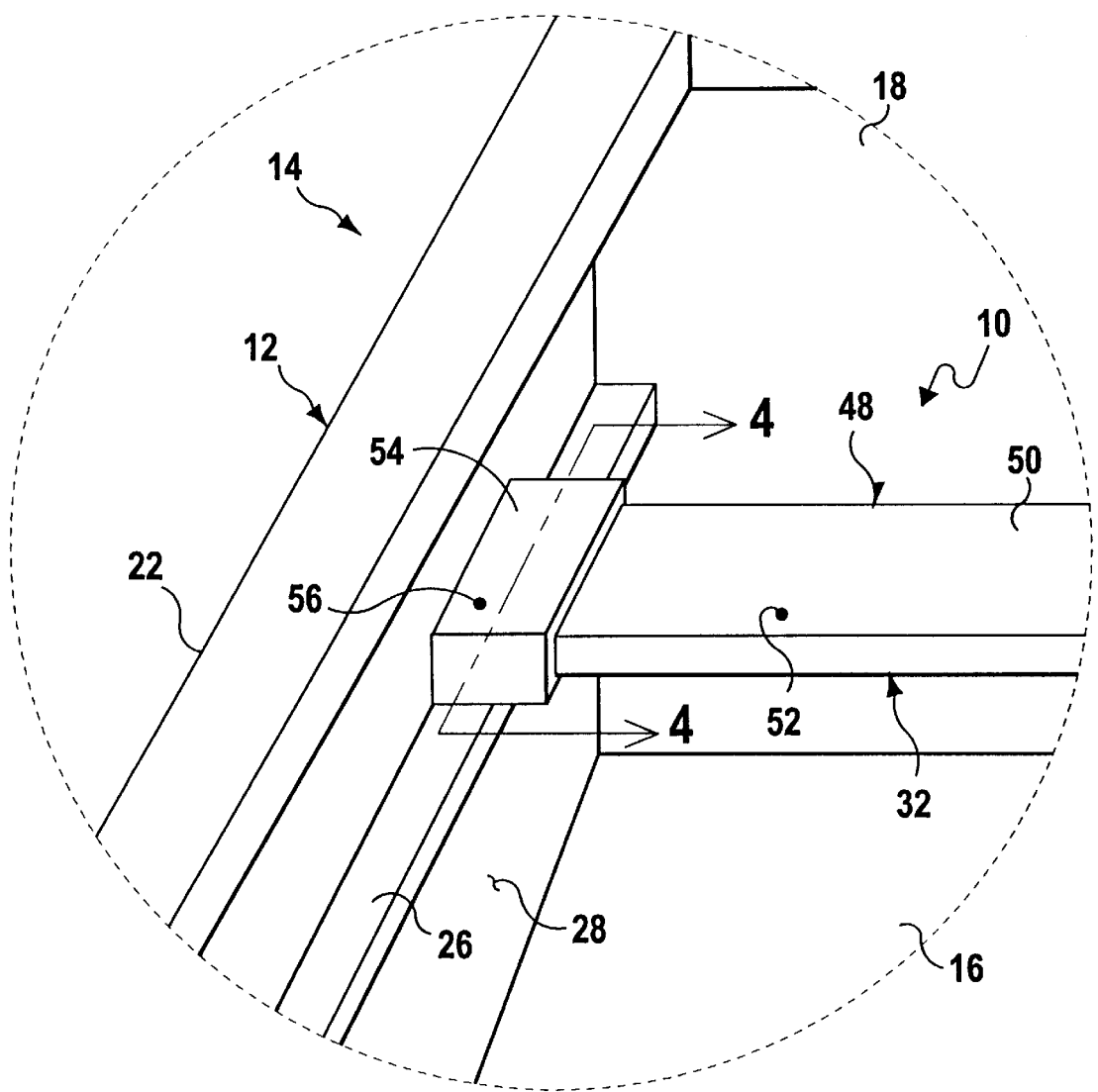
FIG. 3 is an enlarged perspective view of an area in FIG. 2 indicated by arrow 3, showing one end of a support member in greater detail.
Figure 4:
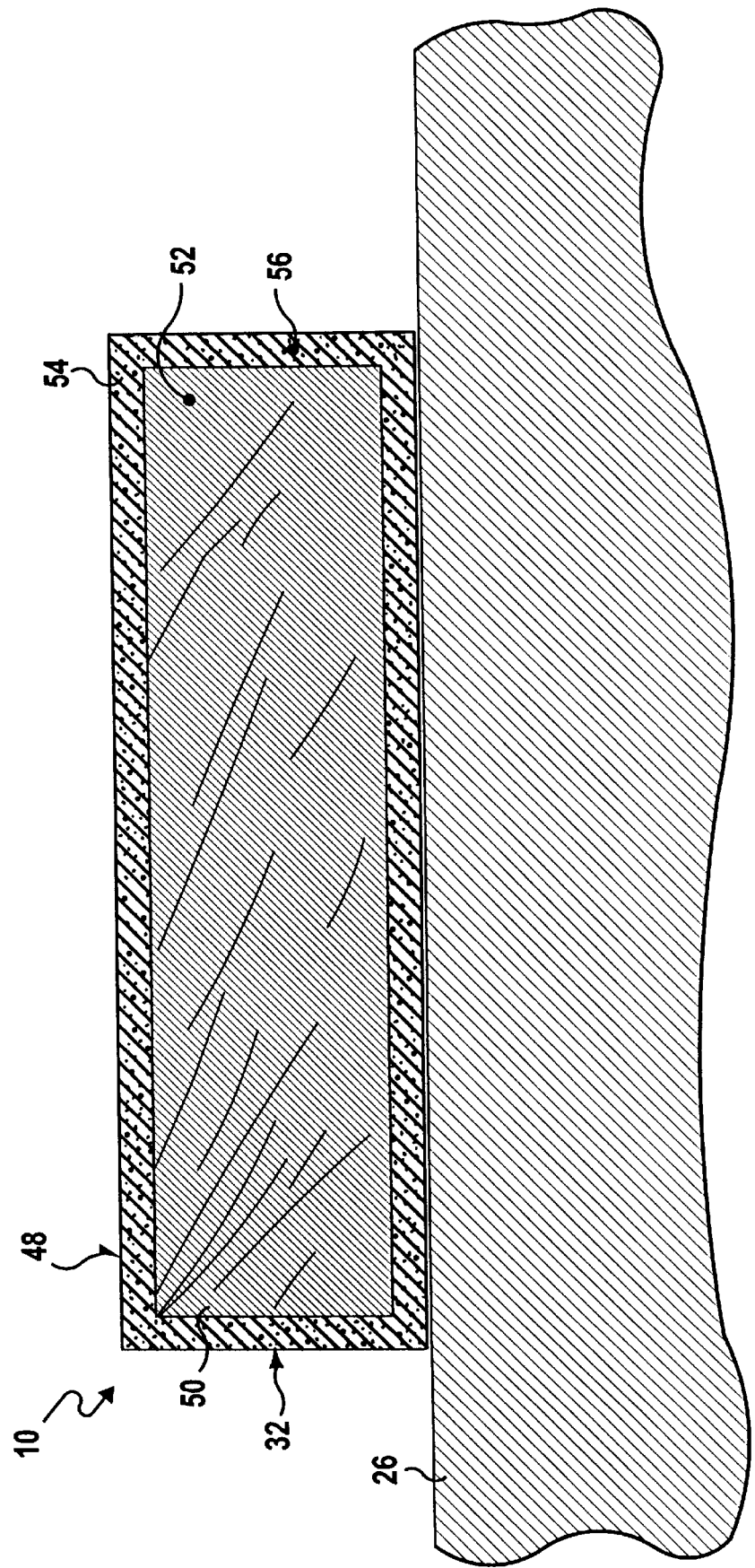
FIG. 4 is an enlarged cross sectional view taken along line 4—4 in FIG. 3.
Figure 5:
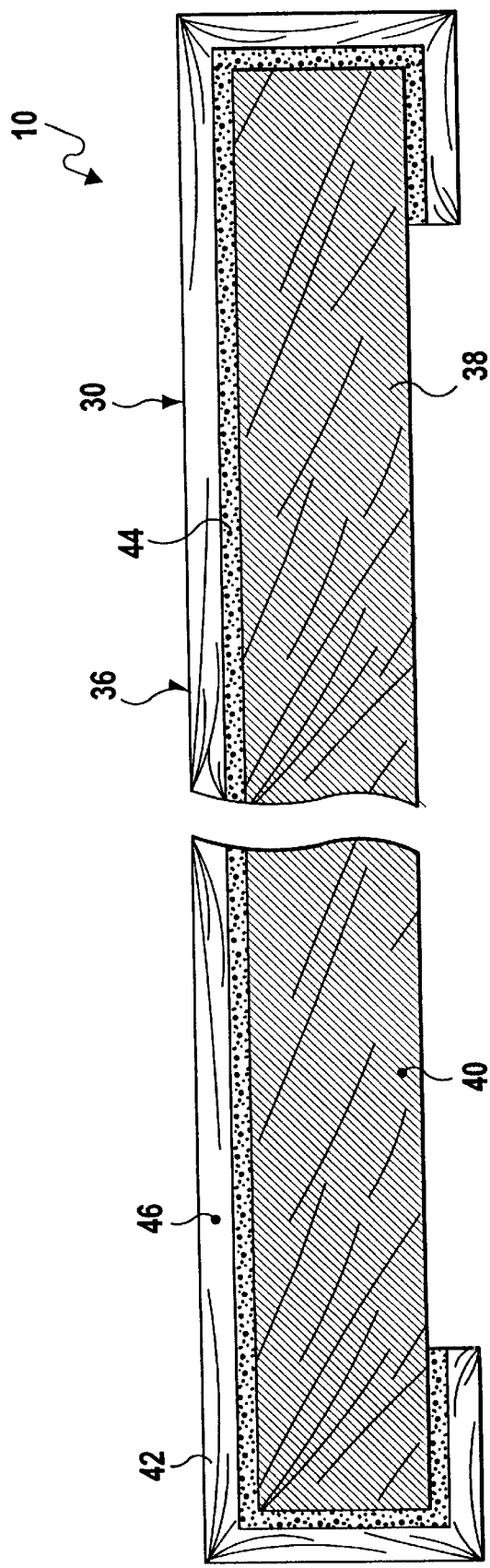
FIG. 5 is an enlarged cross sectional view taken along line 5—5 in FIG. 2, through one panel thereof.

Turning now descriptively to the drawings, in which similar reference characters denote similar elements throughout the several views, FIGS. 1 through 5 illustrate a modular universal shelf 10 of the present invention. With reference numerals used, the following number is used throughout the various drawing figures.

10 modular universal shelf for 12
12 open load bed of 14
14 pickup truck
16 load deck of 12
18 front wall of 12
20 tailgate of 12
22 side wall of 12
24 wheel well of 12
26 horizontal rail on 28
28 inner surface of 22
30 auxiliary deck of 10
32 mounting structure of 10
34 cargo
36 panel of 30
38 flat rectangular board for 36
40 wood for 38
42 covering of 36
44 adhesive
46 cloth material for 42
48 support member of 32
50 elongated rectangular slat for 48
52 wood for 50
54 cap on 48
56 synthetic rubber for 54

The modular universal shelf 10 is for an open load bed 12 of a pickup truck 14. The open load bed 12 has a load deck 16, a front wall 18, a tailgate 20, a pair of side walls a pair of wheel wells 24 and a pair of horizontal rails each formed on an inner surface 28 of each of the side walls 22. The shelf 10 comprises an auxiliary deck 30. A structure 32 is for mounting the auxiliary deck 30 in a secure horizontal manner completely above the load deck 16 and the wheel wells 24, between the horizontal rails 26 on the side walls 22, from the front wall 18 to the tailgate 20, so as to produce a hide-a-way out of sight storage area for cargo 34 between the load deck 16 and the auxiliary deck 30. The auxiliary deck 30 can be utilized to store additional cargo 34, support people, pets and other items thereon.

The auxiliary deck 30 includes a plurality of panels 36 that fit snugly side-by-side together. Each panel 36 consists of a flat rectangular board 38. Each flat rectangular board 38 is fabricated out of wood 40.

Each panel 36 further includes a covering 42 secured thereto with adhesive 44. The covering 42 is fabricated out of a cloth material 46, such as any type of soft fabric or felt.

The mounting structure 32 consists of a plurality of support members 48. Each support member 48 is an elongated rectangular slat 50 sized to extend between the horizontal rails 26, whereby the auxiliary deck 30 will rest upon the elongated rectangular slats 50. Each elongated rectangular slat 50 is fabricated out of wood 52.

Each support member 48 also includes a pair of caps 54 which fit upon opposite ends thereof. Each cap 54 is fabricated out of synthetic rubber 56, so as to reduce vibration when the pickup truck 14 is moving.

OPERATION OF THE INVENTION

To use the modular universal shelf 10, the following steps should be taken:

1. Put the caps 54 on each end of the support members 48.
2. Place the caps 54 that are on each end of the support members 48 on the horizontal rails 26.
3. Make sure that the elongated rectangular slats 50 extend thereacross in spaced apart parallel relationships.
4. Position the panels 36 of the auxiliary deck 30 on the elongated rectangular slats 50, so that they fit snugly in side-by-side relationships.
5. Stand the cargo 34 onto the load deck 16 under the auxiliary deck 30, and onto the auxiliary deck 30.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A modular universal shelf for an open load bed of a pickup truck, the open load bed having a load deck, a front wall, a tailgate, a pair of side walls, a pair of wheel wells and a pair of horizontal rails each formed on inner surfaces of each of the side walls, said shelf comprising:

a) an auxiliary deck, wherein said auxiliary deck includes a plurality of panels that fit snugly side-by-side together; and b) means for mounting said auxiliary deck in a secure horizontal manner completely above the load deck and the wheel wells, between the horizontal rails on the side walls, from the front wall to the tailgate, so as to produce a hide-a-way out of sight storage area for cargo between the load deck and said auxiliary deck, while said auxiliary deck can be utilized to store additional cargo, support people, pets and other items thereon.

2. A modular universal shelf as recited in claim 1, wherein each said panel includes a flat rectangular board.

3. A modular universal shelf as recited in claim 2, wherein each said flat rectangular board is fabricated out of wood.

4. A modular universal shelf as recited in claim 1, wherein each said panel further includes a covering secured thereto with adhesive.

5. A modular universal shelf as recited in claim 4, wherein said covering is fabricated out of a cloth material.

6. A modular universal shelf as recited in claim 1, wherein said mounting means includes a plurality of support members.

7. A modular universal shelf as recited in claim 6, wherein each said support member is an elongated rectangular slat sized to extend between the horizontal rails, whereby said auxiliary deck will rest upon said elongated rectangular slats.

8. A modular universal shelf as recited in claim 7, wherein each said elongated rectangular slat is fabricated out of wood.

9. A modular universal shelf as recited in claim 6, wherein each said support members includes a pair of caps which fit upon opposite ends thereof.

10. A modular universal shelf as recited in claim 9, wherein each said cap is fabricated out of synthetic rubber, so as to reduce vibration when the pickup truck is moving.

11. A modular universal shelf as recited in claim 1, wherein each said panel further includes a covering secured thereto with adhesive.

12. A modular universal shelf as recited in claim 11, wherein said covering is fabricated out of a cloth material.

13. A modular universal shelf as recited in claim 12, wherein said mounting means includes a plurality of support members.

14. A modular universal shelf as recited in claim 13, wherein each said support member is an elongated rectangular slat sized to extend between the horizontal rails, whereby said auxiliary deck will rest upon said elongated rectangular slats.

15. A modular universal shelf as recited in claim 14, wherein each said elongated rectangular slat is fabricated out of wood.

16. A modular universal shelf as recited in claim 15, wherein each said support members includes a pair of caps which fit upon opposite ends thereof.

17. A modular universal shelf as recited in claim 16, wherein each said cap is fabricated out of synthetic rubber, so as to reduce vibration when the pickup truck is moving.

\* \* \* \* \*